United States Patent [11] 3,605,001

[72] Inventor Seinan Miyakawa
 Toshima-ku, Tokyo-to, Japan
[21] Appl. No. 855,451
[22] Filed Aug. 19, 1969
[45] Patented Sept. 14, 1971
[73] Assignee Asahi Kogaku Kogyo Kabushiki Kaisha
 Tokyo-to, Japan
[32] Priority Aug. 21, 1968
[33] Japan
[31] 43/59149

[54] SERVO-CONTROLLED CAMERA DIAPHRAGM INCLUDING A UNIQUE DITHER CIRCUIT
4 Claims, 2 Drawing Figs.
[52] U.S. Cl. ................................................ 318/631,
 318/640, 318/681, 95/10
[51] Int. Cl. .................................................. G05b 11/01
[50] Field of Search ........................................... 318/640,
 631, 681; 95/10

[56] References Cited
UNITED STATES PATENTS
3,110,851 11/1963 Plogstedt et al. ............ 318/20.525 UX
3,340,785 9/1967 Adler et al. .................. 318/20.605 X
3,450,969 6/1969 Soto et al. .................... 318/20.605

Primary Examiner—T. E. Lynch
Attorney—Stanley Wolder

ABSTRACT: A light-controlled automatic diaphragm comprises a network including a photoconductor and potentiometer for producing a DC information signal responsive to the light incident on the photoconductor and the setting of the potentiometer which is adjusted to other photographing parameters. A DC motor is connected to a diaphragm intercepting the light to the photoconductor and an amplifier network controlled by the information signal controls the direction and value of current to the motor and hence its direction of rotation. An oscillator energized by the motor power supply applies an AC signal to the information signal so that AC current is applied to the motor when it approaches its stop condition to brake the motor, the oscillator output being rectified to energize the information signal network.

PATENTED SEP 14 1971 3,605,001

INVENTOR
SEINAN MIYAKAWA

BY Stanley Wolder

ATTORNEY

SERVO-CONTROLLED CAMERA DIAPHRAGM INCLUDING A UNIQUE DITHER CIRCUIT

BACKGROUND OF THE INVENTION

The present invention relates generally to improvements in automatically controlled cameras and it relates particularly to an improved light-controlled automatic diaphragm mechanism.

The use of an electric motor as a servomotor for automatically adjusting a camera diaphragm possesses numerous advantages among which are its ruggedness and structural rigidity, the high attainable accuracy over a wide range of conditions and its general reliability. To achieve a highly sensitive response it is necessary to employ a high-torque motor and a large current control circuit which is highly sensitive to a control signal responsive to the incident light. However, with the above requirements the servomotor brake efficiency is low. Thus, with a conventional servomotor drive system as the response sensitivity is increased, the braking efficiency is decreased. Since, under normal photographing conditions, it is necessary to rapidly vary the diaphragm opening in response to the incident light and to promptly and efficiently fix the diaphragm opening in its properly set state, the conventional servomotor system for the control of the diaphragm opening leaves much to be desired.

SUMMARY OF THE INVENTION

It is a principal object of the present invention to provide an improved camera automatic exposure mechanism.

Another object of the present invention is to provide an improved light-responsive automatic diaphragm control mechanism.

Still another object of the present invention is to provide a servomotor mechanism for automatically controlling the opening of a diaphragm in response to the incident light and other photographing parameters such as film speed or sensitivity and the like.

A further object of the present invention is to provide a diaphragm control mechanism of the above nature characterized by its accuracy, reliability, ruggedness and versatility.

The above and other objects of the present invention will become apparent from a reading of the following description taken in conjunction with the accompanying drawing which illustrates a preferred embodiment thereof.

In a sense the present invention contemplates the provision of an automatic diaphragm control system comprising in an inverse feedback relationship means including a photosensitive element for producing an information signal responsive to the light incident on said photosensitive element, a diaphragm positioned in the path of light incident on said photosensitive element, a reversible electric motor coupled to said diaphragm to increase and reduce the aperture thereof in accordance with the direction of rotation of said motor, and means responsive to said information signal for controlling the rotation and direction of rotation of said motor.

According to a preferred form of the improved mechanism the electric motor is a DC motor having one terminal connected to a center top of a battery whose opposite poles are connected to the other motor terminal through corresponding transistorized current control networks which are connected to operate in opposite phases or at different times in response to the information derived input control signal. The information signal-producing means output is a DC signal whose level responds to the light incident on a photoconductor and to the adjustment of a potentiometer in accordance with one or more photographing parameters other than the incident light. A DC to DC converter is energized by the motor battery and its output energizes the information signal network and it includes an oscillator whose AC output is combined with the information signal. Thus, as the diaphragm reaches its regulated position so that little or no drive current is applied to the motor, an AC current is applied thereto to effect the rapid and efficient braking thereof.

DESCRIPTION OF THE PREFERRED EMBODIMENT

Figure 1:
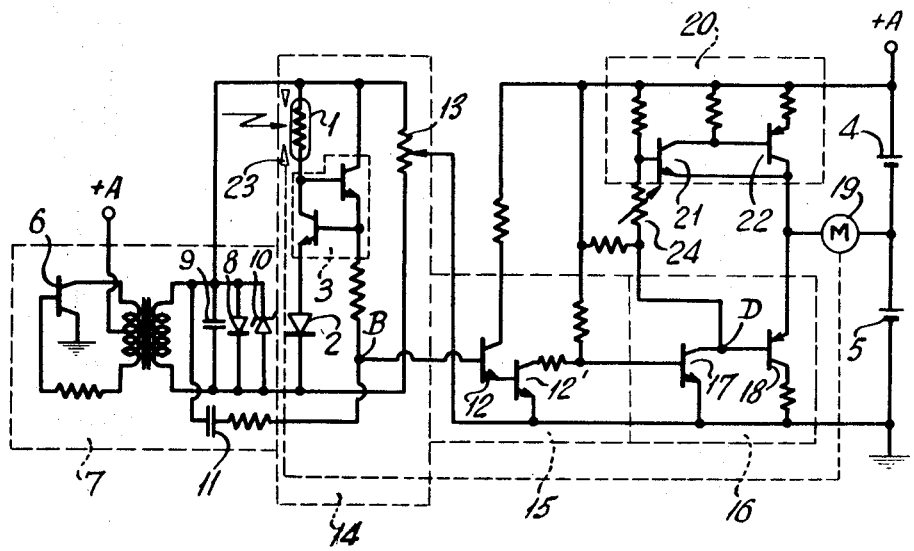
FIG. 1 is a circuit diagram of a preferred embodiment of the present invention.

Referring now to the drawing which illustrates a preferred embodiment of the present invention, the reference numeral 1 generally designates a photoconductor which is exposed to light traversing the camera objective or a separate window associated with the camera. A logarithmic transformation diode 2 is located in a photocurrent circuit under control of and in series with the photoconductor 1. Between the photoconductor 1 and the diode 2 there is connected a transistor detection section 3 which operates in response to the light logarithm transformation current. As a current source for the circuit under control of the detection section 3 and for said photocurrent circuit, there is provided a DC—DC converter 7 which is powered by a pair of series-connected batteries 4 and 5 which energize the converter oscillator including a transistor 6. The oscillator output is coupled through a transformer with a rectifying element 8, a capacitor 9 and a constant voltage diode 10 so that a constant voltage DC output is obtained in the known manner. To the output of the detection section 3, there is applied an AC voltage which is derived from the secondary output of the transformer of the DC—DC converter 7 and connected by a capacitor 11 and resistors serially connecting the outputs of section 3 and the transformer. The junction B of these circuits serves as the information output terminal and is connected to the base of a switching-type transistor 12.

Energized by and connected to the converter 7, are an information signal output section 14 which contains the photocurrent circuit, the circuit under control of the detection section 3, and a bleeder circuit containing a potentiometer 13 which is adjusted in response to photographing conditions other than object brightness, such as the sensitivity value of the used film.

The switching transistor 12 is followed by an amplifying transistor 12'; and transistors 12 and 12' constitute a switching operation amplifying section 15. An output section 16 comprises a two-stage pair of connected transistors 17 and 18 whose input is connected to the output of amplifying section 15. The output section 16 controls a current supply circuit having a current source battery 5 for reversed rotation of a servomotor or DC motor 19. Another output section 20 comprises two transistors 21 and 22 and is of the same structure as that of the output 16. The output section 20 receives its input signal from a point D at the collector of the transistor 17 of the output section 16, and controls the operation of the current supply circuit having a current source battery 4 for normal or forward operation of the servomotor 19.

A diaphragm 23, which is simultaneously driven when the servomotor 19 drives the camera diaphragm is located in front of the light receiving surface of the photoconductor 1. An operating point-adjusting variable resistor 24 is connected between point D and the control input of the output section 20. Other circuit elements shown in the drawing are provided for accurate operation of the arrangement according to the present invention.

Figure 2:
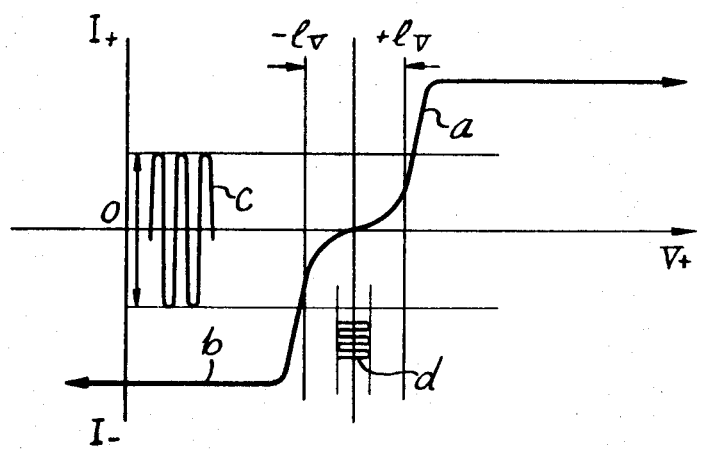
FIG. 2 is a graph illustrating the operating characteristics thereof.

FIG. 2 is a graph showing the operational characteristics of the arrangement according to the present invention. The ordinate axis is provided with a scale of the output current I of output sections 16 and 20 and the abscissa axis is provided with a scale of the information signal voltage V of the information signal output section 14. The characteristic curves $a$, $b$ and $c$ indicate the output currents respectively, the thin lines $+l_v$, $-l_v$ indicate the operative base voltages of the switching transistor 12 which operates in response to said information signal voltage, and the characteristic curve $d$ indicates the AC signal voltage constituent of said information signal voltage.

The operation of the improved network described above is as follows:

First, the resistor 13 is adjusted in accordance with a photographing condition other than object brightness such as the sensitivity value of the used film so that the bleeder voltage corresponds to such photographing condition. The photocurrent, which is under control of the phototransformed resistance value of the photoconductor 1 receiving the light from the object to be photographed, undergoes the action of the logarithmic transformation diode 2, and is detected by the detection section 3 as a current varying in an arithmetical progression in response to a variation in a geometrical progression with common ratio 2. The information signal voltage resulting from such detected value of the detection section 3 is developed at the junction B.

The AC voltage from the DC—DC converter 7 which energizes the information signal-producing network, is applied through the capacitor 11 to the junction B and is superposed on the information signal voltage. The resultant voltage is applied to the base of the switching transistor 12 of the switching operation-amplifying section 15.

In the amplifying section 15 which has thus received such information signal, the switching transistor 12 operates in response to said information signal with its emitter voltage or bias controlled in accordance with photographing condition other than object brightness due to the adjustment of the potentiometer 13. Due to the operation of the logarithmic transformation diode 2, the information signal is obtained as a voltage varying in an arithmetical progression in response to object brightness variation. Also, for the resistor 13, which transforms other photographing condition into an electric signal, a potentiometer is employed which provides a resistance value variation is an arithmetical progression in response to the photographing condition variation, so that the operation is performed with an evenly spaced scale setting arrangement.

When the information signal is applied to the switching transistor 12, if the information signal voltage is sufficient to render it conductive with regard to the emitter voltage thereof, then, a signal generated by the conduction of the transistor 12 is applied, through the following amplifying transistor 12', to the base of the transistor 17 of the output section 16.

This signal, due to the conduction of amplifying section 15 is not enough to cause conduction of the base-emitter circuit of the transistor 17, so that the transistor 17 remains nonconductive. Accordingly, the voltage at the point D of the collector side of the transistor 17 is higher than the emitter voltage of the following transistor 18, so that the transistor 18 is nonconductive and no current is supplied through the output section 16 to the servomotor 19.

A signal under the control of a circuit connected to point D is applied to the base of the transistor 21 of output section 20, and due to this high-voltage signal the transistor 21 becomes conductive. The following transistor 22 also becomes conductive so that the output section 20 becomes conductive and thus the current supply circuit for the servomotor 19 having the current source battery 4 becomes highly conductive. Accordingly, the motor 19 rotates in the normal or forward direction. This normal direction rotation of the servomotor 19 causes the camera diaphragm to be stopped down, and also causes the diaphragm 23, which is located in front of the light-receiving surface of the photoconductor 1, to be stopped down. If the photoconductor 1 is so positioned that it receives the object light which has traversed the camera objective and is controlled by said camera diaphragm arrangement, then of course the diaphragm arrangement 23 and said operation thereof by the servomotor 19 are not necessary since the camera diaphragm serves the function thereof.

Thus, the operation of the servomotor 19 in response to photographing condition including object brightness provides a mechanical inverse feedback which controls the incident light upon the photoconductor 1. As a result the information signal voltage is gradually lowered and approaches to the value which renders the switching transistor 12 nonconductive. This condition is indicated by the characteristic curve $a$ of FIG. 2. The servomotor 19 rotates in the normal direction in the highest output current range as seen in the characteristic curve $a$. As the information signal voltage applied to the base of the switching transistor 12 is lowered, the output current also decreases and the operation of the servomotor 19 approaches its stopping state.

When the object brightness sensed by the photoconductor 1 is relatively low, the information signal voltage is further lowered so that the switching transistor 12 to which it is applied is rendered completely nonconductive. Accordingly, in contrast with the above-described operation, the output section 16 becomes conductive, and the output section 20 becomes nonconductive. Thus, the servomotor 19 rotates in the reversed direction as energized by the current supplied by the battery 5 and under conduction control of the output section 16. This reversed operation of the servomotor 19 actuates the camera diaphragm and the diaphragm 23 in front of the photoconductor 1 in the direction which is reverse to the above-described sequence, that is, it opens said diaphragms. Therefore, due to the mechanical feedback operation of the diaphragm 23, the information signal voltage rises and the output current is controlled as indicated by the characteristic curve $b$ of FIG. 2, so that, as in the above-mentioned case, the operation of the servomotor 19 approaches the state of stoppage.

In the time range when the information signal that stops the operation of the servomotor 19 is applied to the switching transistor 12, the AC voltage as represented by the characteristic curve $d$ of FIG. 2, which has had no appreciable influence upon the information signal voltage when this information signal voltage was sufficiently high or low, now acts abruptly on the transistor 12 as the base input signal thereof. Thus, the two output sections 16 and 20, which are connected to the amplifying section 15 containing the transistor 12, are repeatedly alternately substantially oppositely rendered conductive and nonconductive, though these are not properly reciprocal operations. Under these conditions, the current supplied to the servomotor 19 is in AC form.

Thus, the DC operating servomotor 19 is supplied with an AC input, so that, as is well known, a rapid braking force is applied to the motor 19 so that the operation of the motor 19, which has been approaching the stoppage stage, is rapidly stopped in said AC voltage acting range.

As explained above, in the system of the present invention, an automatic diaphragm control is effected by two output sections of the same type which control the servomotor normal reversed operation current supply circuits in a switching manner in response to the information signal of the information signal output section which produces electric signals corresponding to various photographic conditions. On the information signal there is superposed the AC voltage of the DC—DC converter serving as the current source for the operation of the information signal output section. Thus, when the operation of the motor approaches the neutral stoppage state, the AC voltage acts as an AC input to the motor, thereby performing a positive braking operation. This assures sufficiently high information signal response sensitivity of the servomotor due to such highly efficient braking operation. As rapid stoppage at proper exposure operation state is possible, the accuracy of automatic exposure control is greatly improved. Since the two output transistor sections which constitute a servomotor control section are of the same type, the operation point adjustment of these two transistor sections can be very readily made by adjusting the variable resistor inserted in a circuit connecting these two transistor sections. Further, with such connection of the output transistor sections of the same type a mutually acting switching operation is effected in which the operation of one output transistor section controls that of the other, so that the servomotor can be controlled in a highly accurate manner.

Although the system described above relates to an automatic diaphragm control arrangement, the present invention may also be applied to an electric shutter control arrangement by controlling the timing arrangement through the operation of the servomotor. Further, applying the present invention, it is readily possible to introduce the servomotor operation into exposure meter and general equilibrium circuit operations.

I claim:

1. An automatic diaphragm control system comprising in an inverse feedback relationship means including a photosensitive element for producing a DC information signal responsive to the light incident on said photosensitive element, a diaphragm positioned in the path of light incident of said photosensitive element, a reversible DC electric motor coupled to said diaphragm to increase and reduce the aperture thereof in accordance with the direction of rotation of said motor, an oscillator, means for combining an AC signal derived from said oscillator with said DC information signal to produce a composite signal, means for rectifying the output of said oscillator to produce a DC voltage source, said information signal-producing means being energized by said DC voltage source, and means responsive to said composite information signal for controlling the rotation and direction of and rotation of said motor and for applying an AC braking current to said motor when said information signal is within a predetermined range.

2. The system of claim 1 wherein said signal combining said AC signal to said information signal includes signal-combining means includes a capacitor for combining the output of said oscillator with said information signal.

3. The system of claim 1 wherein said information signal-producing means includes means for selectively adjusting the value of said information signal independently of said photosensitive element.

4. An automatic diaphragm control arrangement comprising an information signal output section (14) under control of a photoconductor (1) serving as an object brightness-sensing element and a resistor (13) to be adjusted in accordance with photographing condition other than object brightness, a DC—DC converter (7) serving as the current source for said output section, a circuit (11) for superposing the AC voltage of said converter on the information signal of said output section, a control section (16) which controls the normal and reversed rotation and stoppage of the servomotor (19) in a switching manner through connection of an output transistor section, which is connected to a switching operation-amplifying section (15) to which is applied the information signal, with another output transistor section (20) of the same type, and an incident light control section (23) for said photoconductor which performs its incident light control operation through drive by said servomotor and in response to an exposure-setting operation through drive by said motor.